US006935393B2

(12) United States Patent
Ghislain Constant

(10) Patent No.: US 6,935,393 B2
(45) Date of Patent: Aug. 30, 2005

(54) TIRE HAVING AN OVERLAY FOR NOISE IMPROVEMENT

(75) Inventor: Michel Marguerite Walther Ghislain Constant, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 118 days.

(21) Appl. No.: 10/692,107

(22) Filed: Oct. 23, 2003

(65) Prior Publication Data

US 2005/0087280 A1 Apr. 28, 2005

(51) Int. Cl.⁷ .............................. B60C 9/22; B60C 9/20
(52) U.S. Cl. ...................... 152/527; 152/531; 152/533
(58) Field of Search ................ 152/527, 531, 152/533

(56) References Cited

U.S. PATENT DOCUMENTS

| | | |
|---|---|---|
| 3,077,915 A | 2/1963 | Weber |
| 3,095,026 A | 6/1963 | Weber |
| 3,095,027 A | 6/1963 | Weber |
| 3,570,574 A | 3/1971 | Marker |
| 3,990,493 A | 11/1976 | Caretta |
| 4,167,130 A | 9/1979 | Miller |
| 4,325,423 A | 4/1982 | Seitz et al. |
| 4,791,973 A | 12/1988 | Davisson |
| 5,529,104 A | 6/1996 | Delias et al. |
| 5,738,740 A * | 4/1998 | Cluzel ................. 152/527 |
| 5,783,003 A | 7/1998 | Lescoffit |
| 5,935,354 A | 8/1999 | Billieres |
| 6,082,425 A * | 7/2000 | Colom ................. 152/531 X |
| 6,082,426 A * | 7/2000 | Colom ................. 152/527 |
| 6,367,527 B1 * | 4/2002 | Cluzel ................. 152/527 |
| 6,394,160 B1 | 5/2002 | Assaad et al. |
| 6,401,778 B1 * | 6/2002 | Cluzel ................. 152/531 X |
| 6,546,983 B1 | 4/2003 | Dyer |
| 6,612,353 B2 * | 9/2003 | Cluzel ................. 152/531 X |
| 6,622,764 B2 * | 9/2003 | Allen et al. ............ 152/531 |
| 6,668,889 B1 * | 12/2003 | Losey et al. ............ 152/527 |

FOREIGN PATENT DOCUMENTS

| | | | | |
|---|---|---|---|---|
| DE | 1 091 890 | * | 10/1960 | ........... 152/531 |
| JP | 62152834 A | * | 7/1987 | ........... 152/527 |
| JP | 62231802 A | * | 10/1987 | ........... 152/531 |
| JP | 62273837 A | * | 11/1987 | ........... 152/527 |
| JP | 63106104 A | * | 5/1988 | ........... 152/531 |
| JP | 05238207 A | * | 9/1993 | ........... 152/533 |
| JP | 2001039114 A | * | 2/2001 | |
| WO | WO 01/45966 A1 | | 6/2001 | |

* cited by examiner

*Primary Examiner*—Adrienne C. Johnstone
(74) *Attorney, Agent, or Firm*—Richard B. O'Planick; David L. King

(57) ABSTRACT

A tire has a belt structure, the belt structure includes an overlay ply reinforced by parallel cords oriented circumferentially, the overlay ply having a pattern of cuts within discrete segments. Each segment has a repeated pattern of cuts arranged in six rows $R_1$–$R_6$. Each cut is spaced at least 100 mm from a cut in an adjacent row and is laterally offset from an adjacent cut by at least 3 mm, this distance being smaller than the cut width to ensure that each overlay cord is cut. The overlay cord lengths within the respective rows is of any length in the range 200 to 500 mm. The cut pitch within the respective rows is of any percentage of the tire circumference in the range 8 to 30%. The circumferential offset between two adjacent segments is of any percentage of the tire circumference in the range of 0.5 to 2%.

5 Claims, 5 Drawing Sheets

TIRE HAVING AN OVERLAY FOR NOISE IMPROVEMENT

FIELD OF THE INVENTION

The invention relates to radial tires, more particularly to tires having overlays for high speed use applications.

BACKGROUND OF THE INVENTION

Tires comprising crown reinforcements have been found to be particularly durable when subjected to high revolution speeds. The overlay ply can, for example, be interposed between the radially outermost belt ply and the tread and consist of a single ply having a width which is about equal to that of the widest of the belt plies. Alternatively, the overlay ply can consist of two separate axially spaced apart ply portions either disposed radially outwardly of the belt such as to cover the edges of the radially outermost belt ply or interposed between the belt plies such as to extend between the edges thereof.

In the following description the overlay ply will be described in terms of a single ply disposed between the belt and the tread, but it will become apparent to a person skilled in the art that problems encountered in the prior art with single overlay plies and the solutions that the present invention presents thereto equally apply to overlay plies consisting of two or more portions as described above.

The overlay ply is usually applied onto the green tire as a single annular layer around the belt with the two end portions of the ply slightly overlapping to form a splice. However, as a result of the expansion of the tire in the curing mold and as a result of the thermal contraction of the textile filaments, the stresses in the cords of the ply are non-uniformly distributed around the circumference of the tire and slippage between the overlay ply end portions tends to occur at their overlap region. This slippage at the overlap region of the overlay ply generally produces an undesired distortion on the underlying belts. This in turn can result in an unbalanced portion in the tire and a reduction in tire uniformity.

It has been proposed in the prior art, to distribute the nonuniformity introduced by the overlay splice over a wider range of the tire circumference and the overlapping area of the overlay ply has been arranged e.g. at an angle of between 30° and 45° to the circumferential direction of the tire, or even at a higher angle (see e.g. LU-A- 85964). While this configuration has resulted in a substantial reduction of the distortion of the belt, it has not resulted in a complete elimination thereof.

U.S. Pat. No. 4,325,423 has further proposed to reduce the negative effect on the belts caused by the slippage at the overlap by using an overlap area of a generally zigzag or wavy form extending across the width of the overlay ply. However, the nonuniformity in the stress distribution of the overlay cords still remains localized over a relatively small portion of the circumference of the tire and belt distortion cannot be completely avoided in that portion.

It has also been proposed in the prior art to use overlay plies comprising several circumferentially spaced overlapping sections, thereby allowing the stresses in the cords to be taken up by the overlap portions which are spaced around the circumference of the tire (see e.g. DE-A-2 824 357 and DE-A-2 821 093). However, this solution is costly from a manufacturing point of view as it requires the single turn overlay to be preassembled from several smaller sections.

It has further been proposed in the prior art, e.g. U.S. Pat. No. 4,284,117, to use single yarn reinforcing cords for the overlay ply and to wrap several turns of this layer around the circumference of the tire thereby virtually eliminating the possibility of any slippage of the overlay ply in the final tire. Since the ply itself cannot accommodate the expansion of the belt through slippage, the expansion is entirely taken up by the reinforcing yarns which to this effect have a relatively low modulus of elongation as compared to the cords used in single layer overlay plies.

In U.S. Pat. No. 4,791,973 a prior art tire is characterized in that the textile reinforcing elements of the overlay ply consist of successively aligned cord sections arranged in parallel rows each having a length which is comprised between $\frac{1}{4}$ and $\frac{1}{8}$ of the corresponding circumferential development of the tire, the cord sections in each row having substantially equal length, and being separated by interruptions of a width such that the total width of the interruptions per circumferentially extending row of cords is less than 4% of the corresponding circumferential development of the tire.

By corresponding circumferential development of the tire is meant throughout this specification the circumference of the overlay ply at the mid-circumferential plane when the tire is mounted on its corresponding rim and inflated to its design pressure, but not subjected to a load.

It is to be noted that U.S. Pat. No. 3,990,493 describes an overlay ply in a radial tire which comprises interruptions or cuts which are regularly spaced around the circumference. However, the discontinuous cord portions have a length which is not greater than $\frac{1}{10}$ of the corresponding circumferential development of the tire and is preferably comprised between $\frac{1}{100}$ and $\frac{4}{100}$ of the corresponding circumferential development of the tire.

It is further to be noted that U.S. Pat. No. 2,945,525 describes an annular layer comprising ring shaped reinforcing elements which have at least one interruption for each complete circumference of the tire. The layer described in this patent is a belt layer which is the sole reinforcement of the crown area of the tire and fulfills the function of the belt which is completely different from the function fulfilled by the overlay ply of the present invention.

It is an object of the present invention to provide a pneumatic tire which is durable at high speeds and which at the same time has a high degree of uniformity and exceptional ride comfort, particularly in the area of low noise generation.

It is a further object of the invention to provide a tire which can be manufactured in a cost-effective manner and which employs overlay plies comprising reinforcement cords with a relatively high modulus of elongation.

SUMMARY OF THE INVENTION

A tire has an outer tread and an inner casing with a belt structure, the belt structure includes an overlay reinforced by parallel cords oriented circumferentially having a width W between lateral outermost edges, the overlay having a pattern of cuts within discrete segments. Each segment has a repeated pattern of cuts arranged in six rows. Each cut is spaced at least 100 mm from a cut in an adjacent row and is laterally offset from an adjacent cut by a distance Dc which is at least 3 mm. To ensure that each overlay cord is cut, the cut width C is larger than Dc. The overlay cord lengths within the respective rows is of any length L in the range 200 to 500 mm. The cut pitch within the respective rows is of any percentage P of the tire circumference in the range 8 to 30%.

The circumferential offset between two adjacent segments is of any percentage 0 of the tire circumference in the range of 0.5 to 2%.

The cut pattern of the preferred embodiment of the invention has the cut pattern arranged in the six rows of 0, 53, 21, 89, 34 and 72 percent respectively of the cut pitch P of the cord relative to row $R_1$ and repeated within each row with the cut length L, wherein the cut pitch percentage P is 20.9%. The circumferential offset O between two adjacent segments, expressed in percentage of M, is 1.16%.

The overlay cord length L is defined by L=P*M where M is the tire perimeter measured at the tire centerline in millimeter.

BRIEF DESCRIPTION OF THE DRAWINGS

The invention will now be illustrated with reference to the accompanying drawings in which.

DETAILED DESCRIPTION OF THE INVENTION

Figure 1:
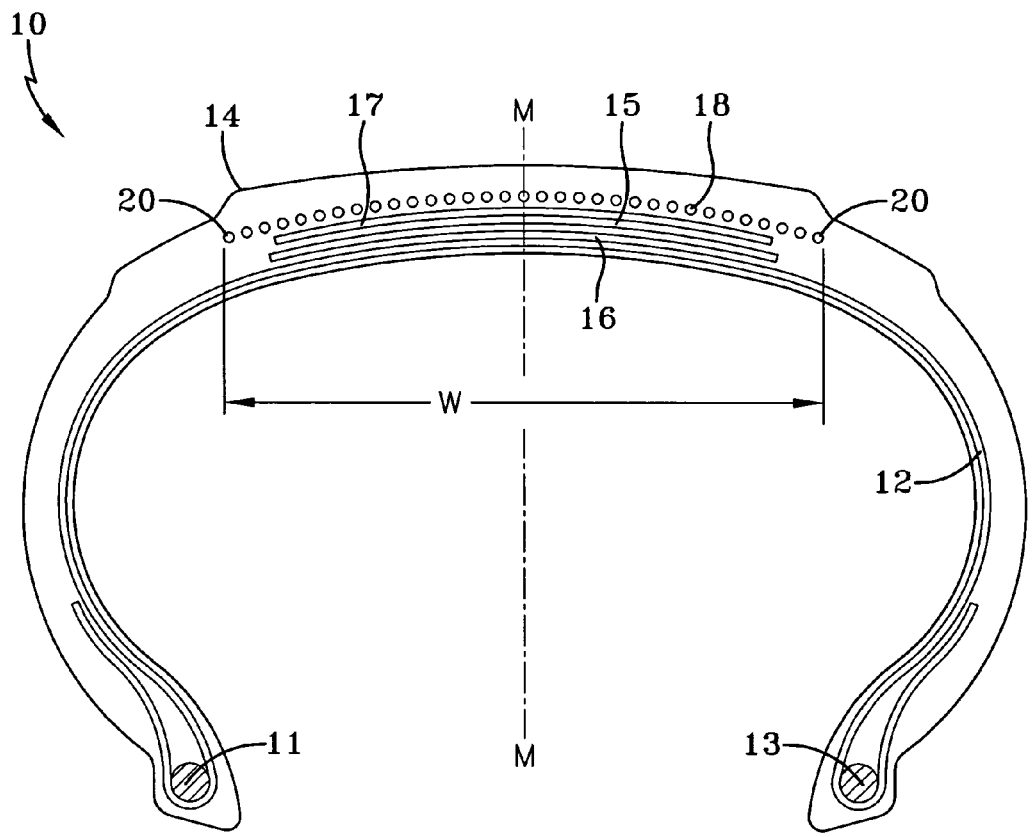
FIG. 1 is a schematic representation of a radial section through a tire showing the crown reinforcement of a tire according to the present invention.

With reference to FIG. 1 there is illustrated a radial carcass pneumatic tire 10. The tire 10 comprises a pair of annular beads 11 and 13 with a radial carcass ply 12 extending from one bead 11 to the other bead 13. The cords of the carcass ply are substantially parallel to each other and extend from bead to bead so as to make an angle with the mid-circumferential plane M—M of between 80° and 90°. By "mid-circumferential plane" is meant a plane perpendicular to the axis of rotation of the tire and which is located midway between the beads 11 and 13. The cords of the carcass ply 12 can be made of any suitable material, for example, rayon, steel, polyester, polyamide or aromatic polyamide.

The treaded crown area 14 of the tire is reinforced by a belt assembly 15 located radially outwardly of the carcass ply 12 and which extends circumferentially around the tire. The belt assembly comprises two concentric breaker belts 16 and 17, each of which comprises an elastomeric ply reinforced by steel cords or other known suitable material, for example, glass fiber or aromatic polyamide. Within each belt the cords are substantially parallel to each other and make an angle of between 15° to 30° with the mid-circumferential plane M—M.

The cords of the first belt 16 extend in the diagonally opposite direction to the cords of the second belt 17.

Radially outwardly of the belt assembly 15 is a textile cord reinforced overlay ply 18 having a width W between its lateral edges 20 such that it is at least as wide as the belt assembly 15 so as to completely cover it. The overlay ply 18 is an elastomeric ply, containing cords which extend substantially circumferentially around the tire, that is, they make an angle of between 0° and 5° with the mid-circumferential plane M—M.

Figure 2:
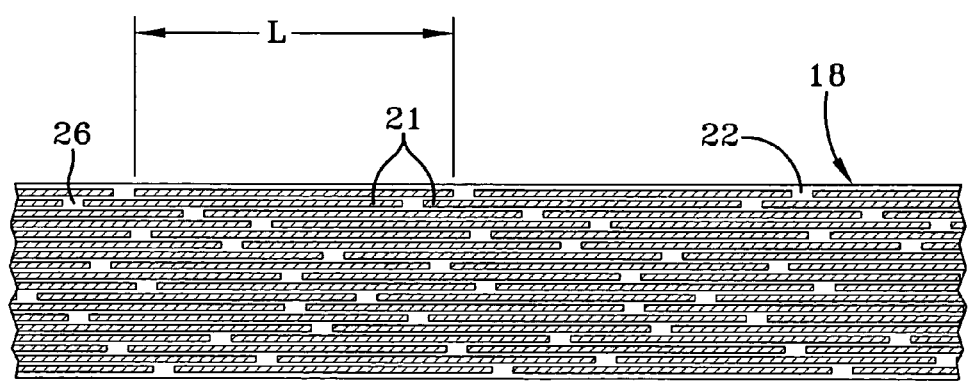
FIG. 2 shows a partial plan view of an overlay ply according to the invention.

FIG. 2, which shows a partial plan view of the overlay ply 18 according to the invention, illustrate more clearly that the overlay ply comprises sections 21 consisting of discontinuous lengths of cords which are embedded in a sheet of a suitable rubber compound. The cord sections 21 in the overlay ply are aligned end to end in a plurality of spaced apart mutually parallel rows. The interruptions 22 between the adjacent ends of any two sections of cord in one row are offset longitudinally with respect to interruptions 24 between cord sections in the immediate adjacent row. In other words, the interruptions in a given row are staggered with respect to the interruptions in an adjacent row. As used herein the term "interruption" refers to and is used interchangeably with the term "cut".

The spacing of the interruptions in this manner is necessary to ensure an optimum distribution of reinforcing cord portions around the circumference of the tire, required for high speed, wear and noise performances of the tire.

It is preferred that the disposition of the interruptions of the individual cords in adjacent rows do not follow any regular pattern such as, for example, a constant spacing between the interruptions in the circumferential direction. It is believed that a particularly advantageous construction is obtained when the spacings between the interruptions in adjacent rows are distributed in a non-uniform predetermined sequence manner. To this effect, cut pattern generators, which are known in the computer art, can be used to derive sequences for calculating the positions of the interruptions in the circumferential direction.

It is desirable that each of the cord sections contributes with substantially equal strength to help the overlay ply 18 to fulfill its function as a circumferential restrictor ply. It is therefore preferred although not required to use plies with cord sections of substantially equal length in each of the rows as illustrated in FIG. 2. By substantially equal length is meant that the length of the cord sections in each row does not vary by more than about 5% of the average section length.

It is believed important that the repeated portion of cuts be formed within discrete segments 19. The discrete segments 19 are wrapped around the circumference of the tire 10 and have a width w between lateral edges and are joined to adjacent segments at the lateral edges to form the overlay. Each segment 19 has a repeated pattern of cuts having a cut width C arranged in six rows, each cut being spaced at least 100 mm from a cut in an adjacent row and each segment is offset in the lateral direction a distance Dc from an adjacent segment by at least 3 mm, the cut width C being greater than the distance Dc. The overlay cord lengths within a respective row is a length L in the range of 200 to 500 mm The cut pitch within the respective rows is of any percentage P of the tire circumference in the range 18 to 30%. The circumferential offset between two adjacent segments is any percentage 0 of the tire circumference in the range of 0.5 to 2%.

It may be advantageous to vary the restrictive effect of the overlay ply 18 across the width of the tire 10 such that, for example, the shoulder portions of the tire are more rigid than the center portion of the tire. This can be achieved by providing cord sections 21 in the shoulder portion of the tire 10 which have a length which is larger than the length of the cord sections 21 in the central portion of the tire 10. Hence, while being of substantially equal length in each circumferential row, the cord sections 21 in each row may decrease in length from the shoulder portions of the tire to the central portion of the tire.

The material for the textile reinforcing elements may be selected from one or more of the conventional materials that are used in tires such as nylon, rayon, aramid, polyester, etc. It is desirable, however, that the reinforcing elements have a relatively high modulus of elongation, i.e. a load capacity greater than 20 Newtons at 4% elongation. The present invention permits the use of high modulus cords since the expansion of the overlay ply during the curing process can be taken up entirely by the gaps between the cord sections. The interruptions or gaps open slightly under the action of the expansion forces and accommodate the change in circumferential length of the overlay ply.

The overlay plies 18 can be made from conventional ply stock containing uncut lengths of cord which may be calendered in the usual manner. The cords are subsequently cut into sections at regularly spaced intervals. This separation of the reinforcing cords into sections 21 may be effected by cutting, punching, grinding, slicing, abrading or a similar process. The cutting operation can take place at the calender itself, prior to winding up the ply material, or just prior to the application of the overlay ply 18 to the tire at the tire building machine.

From the above description it becomes apparent that the tires 10 of the present invention can be manufactured in a very cost-effective manner. Whereas in prior art manufacturing, a different overlay ply had to be used for each tire size for effectively accommodating the stresses in the ply cords, the present invention allows for a standard overlay ply to be used in a variety of tire sizes. The interruptions 22 that are provided in the cords of the overlay ply 18 of the present invention contribute towards an effective control of the tensions in the overlay ply 18.

In a conventional manufacturing process it may be advantageous to use one single cut to separate a plurality of continuous reinforcing cords. The cutting device is thereby greatly simplified and the total number of cuts that are made on the ply is considerably reduced.

Figure 3:
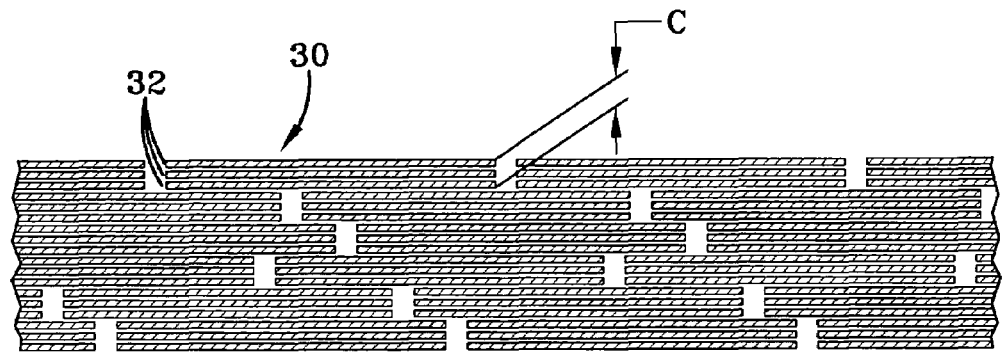
FIGS. 3 and 4 show partial plan views of overlay plies according to preferred embodiments of the present invention.

FIG. 3 illustrates an overlay ply 30 wherein the interruptions 32 of a group of 3 adjacent cord sections lie in the same radial plane. The width of the cut, in other words the width that is occupied by the interruptions of adjacent cords which lie in the same radial plane is indicated in FIG. 3 by the distance C. While the embodiment of FIG. 3 illustrates a plurality of interruptions 32 which lie in the same radial plane, they can equally be disposed in a plane which makes an angle with the radial direction.

As described above in connection with the embodiment of FIG. 2, the interruptions are preferably staggered in the circumferential direction and distributed around the circumference of the tire in an irregular manner.

Applicant has found that the beneficial results of the invention are still obtained when the width C of the cuts in the same radial plane corresponds to about 10% of the width of the overlay ply. This width corresponds to about the width that 20 reinforcing cords occupy in the overlay ply 18, 30, 60 of a large size passenger tire.

The interruptions between the successively aligned cord sections are of negligible width, i.e. the total width of the interruptions per circumferentially extending row of cords is less than about 4% of the circumferential development of the tire.

The invention will now be illustrated by way of an example.

Figure 4:
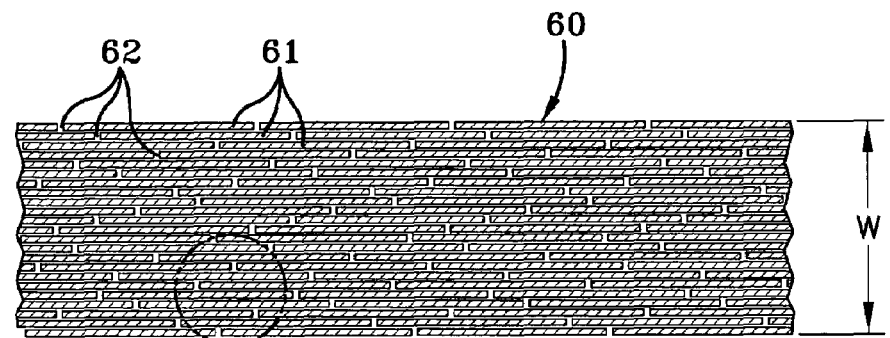

FIG. 4 illustrates a partial plan view of the overlay ply 60 of a tire of size 185/65 R 14:

The width W of the ply 60 is about 140 mm and it contains about 25 rows of reinforcing cord sections 41, per 25 mm (1 inch) of width, i.e. the overlay ply 60 is composed of a total of about 138 rows of aligned reinforcing cord sections 61. The interruptions 62 between cord sections are arranged in groups such that the interruptions in about six adjacent rows lie in the same radial plane. The portion of the overlay ply that is illustrated represents about one half of the total ply. In the portion shown each row comprises about two and a half cord sections 61. The cord sections each have a length of about 200 TO 500 mm which is about ⅕ of the circumference of the tire. For more clarity, the individual cord sections are not shown on FIG. 4, but are illustrated as groups of adjacent cord sections.

Figure 5:
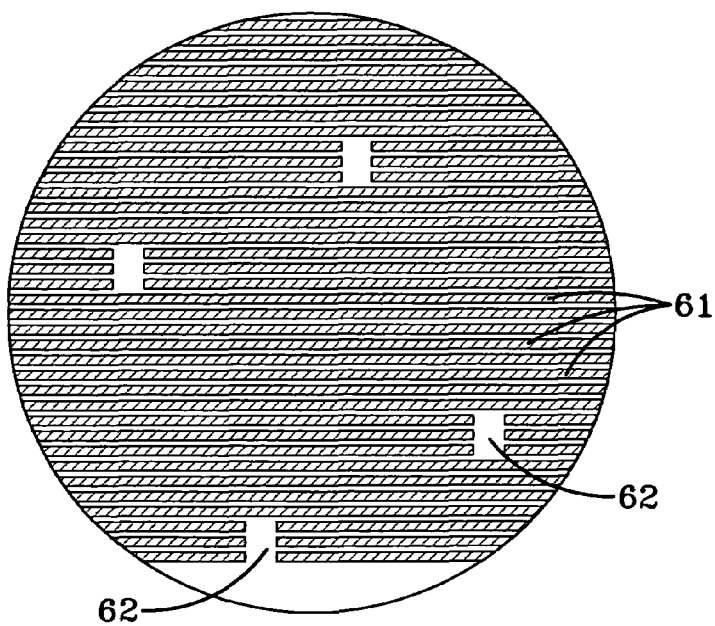
FIG. 5 shows an enlarged view of a portion of the ply of FIG. 4.
Figure 6:
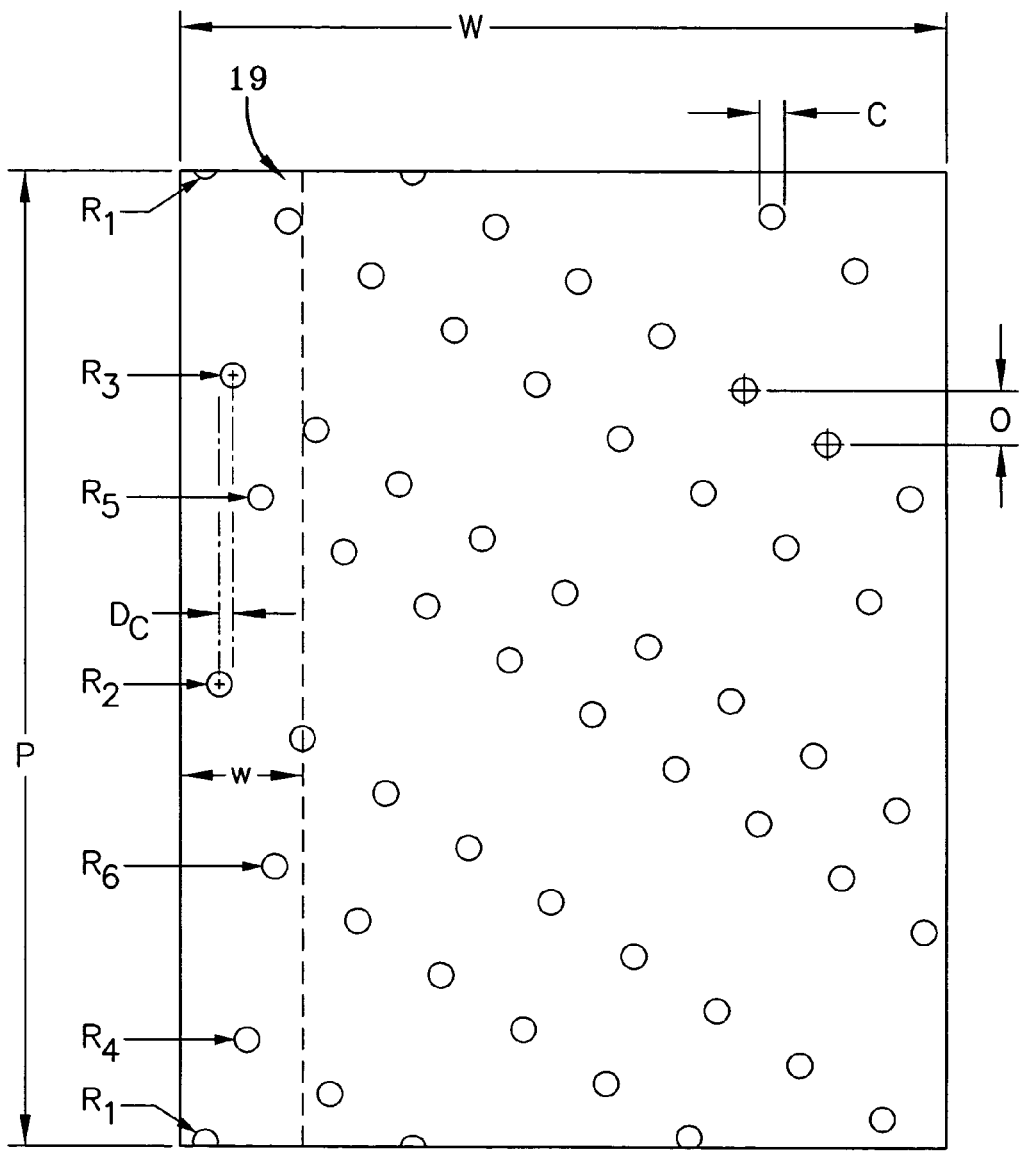
FIG. 6 shows the cut distribution in the overlay material treatment for a length P.

FIG. 5 illustrates an enlarged view of the portion of the ply of FIG. 4 that is encircled. The individual cord sections 61 and the interruptions 62 between cord sections 61 can be clearly seen. For simplicity of illustration, the cord sections are shown as lines.

The interior noise measurement performed in 185/65R14 size tires has a 3 dB(A) average reduction of the $26^{th}$ interior noise order, which is the most tonal order in the speed average order spectrum and which is induced by the tire overlay, over the 80–20 km per hour speed range. The subjective noise test results that were performed on the same tire constructions show that the new pitched overlay tire construction improves the subjective pattern-whine noise performance in the 80–20 km per hour speed range by a 0.75 subjective point in average versus the prior overlay construction known in the art.

Figure 7:
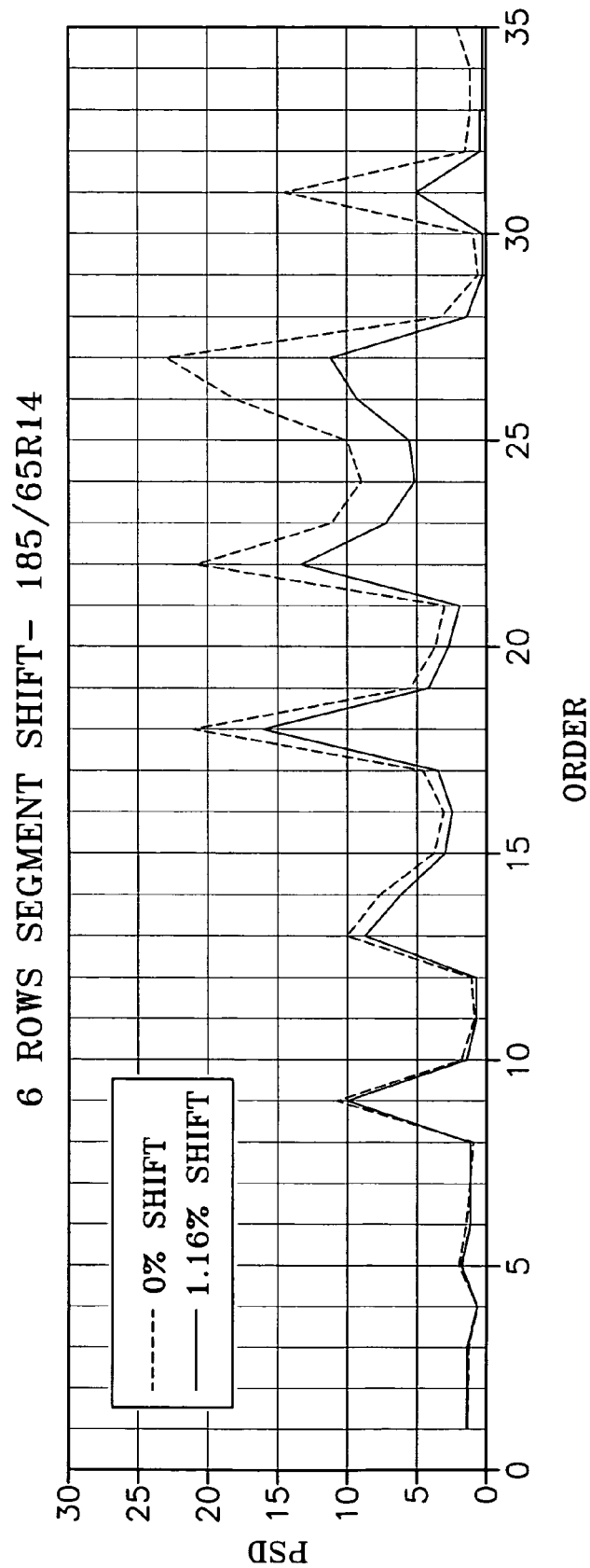
FIGS. 7 and 8 are charts of the noise order spectrum predictions of a tire employing overlays including the overlay of the present invention.
Figure 8:
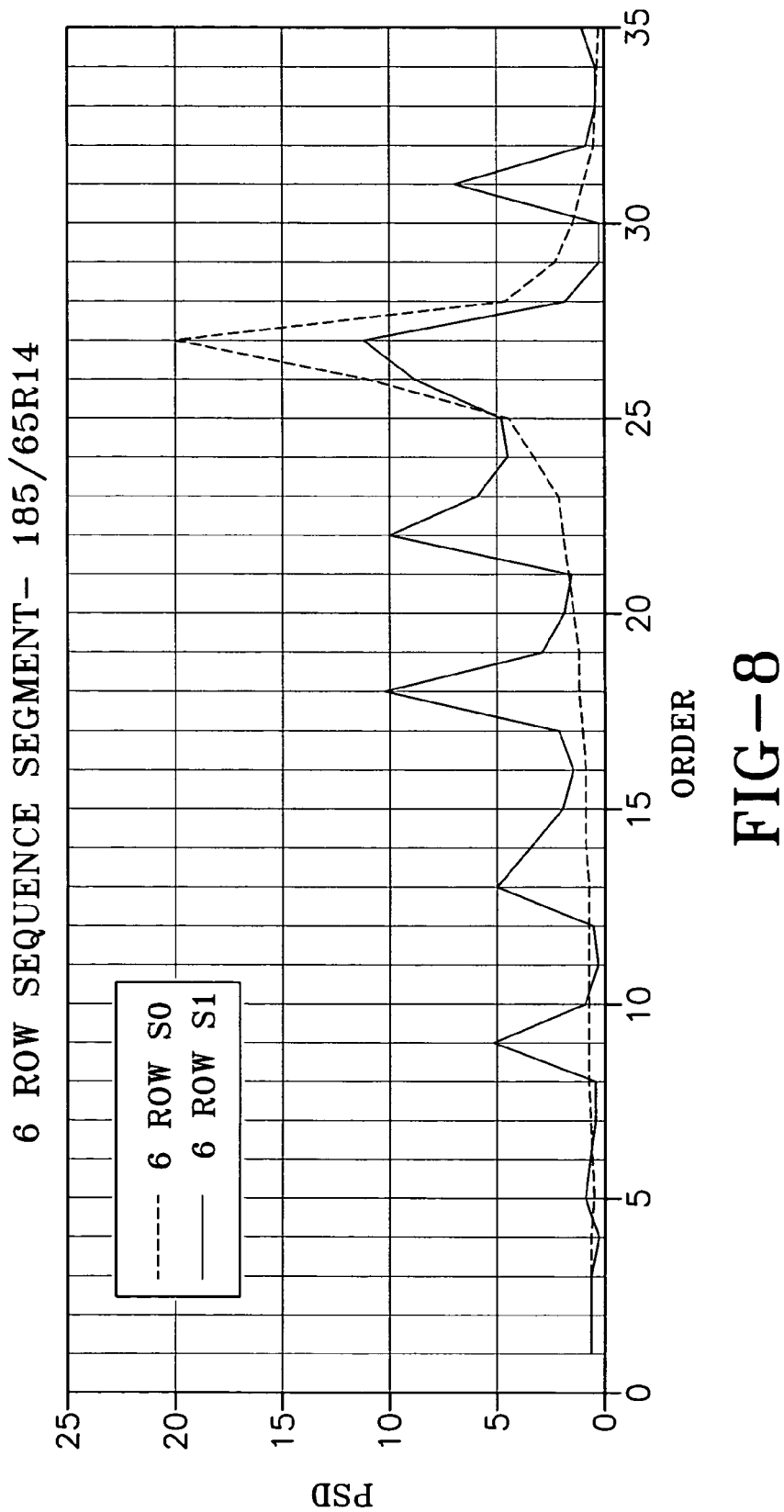

FIG. 7 shows the predicted noise effect of the 1.16% circumferential offset of adjacent segments 19, expressed in percentage of the tire circumference. The six rows proposed arrangement within each segment 19 is predicted to have noise characteristics as shown in the chart in FIG. 8.

While the invention has been described in terms of an overlay ply comprising a single layer of textile reinforcing cords, it equally applies to tires comprising overlay plies with more than one layer of textile reinforcing cords, such as overlay plies comprising two separate axially spaced apart ply portions. Such ply portions can either be disposed radially outwardly of the edges of the radially outermost belt ply or they can be radially interposed between the belt plies at the edges thereof.

Finally, the invention also applies to tires comprising multiple, superposed layers of textile reinforcing cords. It is indeed well known in the tire art that the high speed durability of tires can be further increased by superposing more than one reinforcing layer in the crown area of the tire.

What is claimed is:

1. A tire having an outer tread and an inner casing with a belt structure, the belt structure includes an overlay reinforced by parallel cords oriented circumferentially having a width W between lateral outermost edges, the overlay having a pattern of cuts within discrete segments, each segment being wrapped around the circumference of the tire and a width w between lateral edges of the respective segment and joined to adjacent segments at the lateral edges, each segment being characterized by:

a repeated pattern of cuts arranged in six rows each cut being spaced at least 100 mm from a cut in an adjacent row and being laterally offset from an adjacent segment by at least 3 mm, this distance being smaller than the cut width to ensure that each overlay cord is cut, the overlay cord lengths within the respective rows being of any length L in the range 200 to 500 mm, the cut pitch within the respective rows being of any percentage P of the tire circumference in the range 8 to 30%, the circumferential offset between two adjacent segments being of any percentage O of the tire circumference in the range of 0.5 to 2%.

2. The tire of claim 1 wherein the cut pattern has the cut pattern arranged in the six rows of 0, 53, 21, 89, 34 and 72 percent respectively of the cut pitch P of the cord relative to row $R_1$ and repeated within each row with the cut length L.

3. The tire of claim 1 wherein the cut pitch percentage P is 20.9%.

4. The tire of claim 3 wherein the overlay cord length L is defined by L=P*M where M is the tire perimeter measured at the tire centerline in millimeter.

5. The tire of claim 1 wherein the circumferential offset O between two adjacent segments, expressed in percentage of M the tire perimeter measured at the tire centerline, is 1.16%.

* * * * *